United States Patent
Zhao

(10) Patent No.: US 10,937,213 B2
(45) Date of Patent: Mar. 2, 2021

(54) SYSTEMS AND METHODS FOR SUMMARIZING AND STEERING MULTI-USER COLLABORATIVE DATA ANALYSES

(71) Applicant: FUJI XEROX CO., LTD., Tokyo (JP)

(72) Inventor: Jian Zhao, Cupertino, CA (US)

(73) Assignee: FUJI XEROX CO., LTD., Tokyo (JP)

( * ) Notice: Subject to any disclaimer, the term of this patent is extended or adjusted under 35 U.S.C. 154(b) by 0 days.

(21) Appl. No.: 16/454,842

(22) Filed: Jun. 27, 2019

(65) Prior Publication Data

US 2020/0410729 A1  Dec. 31, 2020

(51) Int. Cl.
*G06T 11/20* (2006.01)
*G06F 16/901* (2019.01)
*G06F 8/41* (2018.01)
*G06F 8/38* (2018.01)
*G06F 8/34* (2018.01)

(52) U.S. Cl.
CPC .............. *G06T 11/206* (2013.01); *G06F 8/34* (2013.01); *G06F 8/38* (2013.01); *G06F 8/44* (2013.01); *G06F 16/9024* (2019.01)

(58) Field of Classification Search
CPC .............. G06T 11/206; G06T 2200/24; G06F 16/9024; G06F 8/34; G06F 8/38; G06F 8/44; G06F 3/04842
See application file for complete search history.

(56) References Cited

U.S. PATENT DOCUMENTS

| | | | |
|---|---|---|---|
| 6,792,595 B1* | 9/2004 | Storistenau | G06F 8/33 345/650 |
| 9,911,211 B1* | 3/2018 | Damaraju | G06F 16/904 |
| 2009/0033664 A1* | 2/2009 | Hao | G06T 11/206 345/440 |
| 2011/0261049 A1* | 10/2011 | Cardno | G06Q 10/10 345/419 |
| 2019/0294631 A1* | 9/2019 | Alcantara | G06F 16/90332 |

OTHER PUBLICATIONS

Powerbi. Retrieved on Jun. 26, 2019; https://powerbi.microsoft.com/en-us/ (3 pages).
Project jupyter; Retrieved on Jun. 26, 2019; http://jupyter.org/ (2 pages).
Tableau software; Retrieved on Jun. 26, 2019; https://www.tableau.com/ (2 pages).

(Continued)

*Primary Examiner* — Ke Xiao
*Assistant Examiner* — Andrew Shin
(74) *Attorney, Agent, or Firm* — Procopio, Cory, Hargreaves & Savitch LLP

(57) ABSTRACT

Example implementations described herein are directed to a graphical user interface (GUI) tool that provides representations of generated charts on a map, wherein distances between representations are provided based on similarity between charts. Similarity is determined through machine learning techniques that are applied on a vectorized form of charts. Example implementations described herein encode charts into vectors using deep learning techniques, which facilitates machine learning techniques such as nearest neighbor to be utilized to determine similarity between charts based on their corresponding vectors.

20 Claims, 10 Drawing Sheets

(56) References Cited

OTHER PUBLICATIONS

Brehmer, M. et al. "A Multi-Level Typology of Abstract Visualization Tasks" IEEE Transactions on Visualization and Computer Graphics, 2013, pp. 2376-2385, vol. 19 issue 12 (10 pages).

Dibia, V. et al. "Data2Vis: Automatic Generation of Data Visualizations Using Sequence to Sequence Recurrent Neural Networks" CoRR, Nov. 2018; arXiv:1804.03126 (10 pages).

Isenberg, P. et al. "Collaborative Visualization: Definition, Challenges, and Research Agenda" Information Visualization Journal (IVS), SAGE, 2011, Special Issue on Information Visualization: State of the Field and New Research Directions, Nov. 5, 2011; pp. 310-326, 10 (4) (16 pages).

Jankun-Kelly, T.J., et al. "A Model and Framework for Visualization Exploration" IEEE Transactions on Visualization and Computer Graphics, Mar. 2007, pp. 357-369, 13(2) (12 pages).

Kusner, M. et al. "Grammar Variational Autoencoder" ICML'17 Proceedings of the 34th International Conference on Machine Learning, Aug. 6-11, 2017, pp. 1945-1954; vol. 70; Sydney, NSW, Australia (12 pages).

Mackinlay, J. et al. "Show Me: Automatic Presentation for Visual Analysis" IEEE Transactions on Visualization and Computer Graphics, Nov. 2007, pp. 1137-1144; 13(6) (9 pages).

Mahyar, N. et al. "Supporting Communication and Coordination in Collaborative Sensemaking" IEEE Transactions on Visualization and Computer Graphics, Dec. 2014, pp. 1633-1642, 20(12) (10 pages).

Peltonen, J. et al. "Information retrieval approach to meta-visualization" Machine Learning, May 2015; pp. 189-229, 99(2) (41 pages).

Sarvghad, A. et al. "Exploiting Analysis History to Support Collaborative Data Analysis" In Proceedings of Graphics Interface Conference, Jun. 3-5, 2015, pp. 123-130, Halifax, Nova Scotia, Canada (8 pages).

Satyanarayan, A. et al. "Vega-Lite: A Grammar of Interactive Graphics" IEEE Transactions on Visualization and Computer Graphics, Jan. 2017, pp. 341-350, 23(1) (10 pages).

Tobiasz, M. et al. "Lark: Coordinating Co-located Collaboration with Information Visualization" IEEE Transactions on Visualization and Computer Graphics, Nov./ Dec. 2009, pp. 1065-1072, 15(6) (8 pages).

Vartak, M. et al. "SEEDB: Automatically Generating Query Visualizations" Proceedings of VLDB Endowment, Sep. 1-5, 2014, pp. 1581-1584, vol. 7, No. 13 (5 pages).

Wongsuphasawat, K. et al. "Towards A General-Purpose Query Language for Visualization Recommendation" In Proceedings of the Workshop on Human-In-the-Loop Data Analytics, HILDA '16, Jun. 26, 2016, San Francisco, CA, USA (6 pages).

Wongsuphasawat, K. et al. "Voyager: Exploratory Analysis via Faceted Browsing of Visualization Recommendations" IEEE Transactions on Visualization and Computer Graphics, Oct. 25, 2015; pp. 649-658, 22(1) (10 pages).

Wongsuphasawat, K. et al. "Voyager 2: Augmenting Visual Analysis with Partial View Specifications" In Proceedings of the 2017 CHI Conference on Human Factors in Computing Systems, CHI '17, May 6-11, 2017, pp. 2648-2659, Denver, CO, USA (12 pages).

Xu, S. et al. "Chart Constellations: Effective Chart Summarization for Collaborative and Multi-User Analyses" Eurographics Conference on Visualization (EuroVis) 2018, pp. 75-86; vol. 37, No. 3; 12 pages.

Zhao, J. et al. "Supporting Handoff in Asynchronous Collaborative Sensemaking Using Knowledge-Transfer Graphs" IEEE Transactions on Visualization and Computer Graphics, Dec. 18, 2017; pp. 340-350, 24(1) (12 pages).

* cited by examiner

| Layer (type) | Output Shape | Param X | Connected to |
|---|---|---|---|
| input_3 (InputLayer) | (None, 15, 41) | 0 | |
| convw_1 (Conv1D) | (None, 13, 4) | 496 | input_3[0][0] |
| batch_1 (BatchNormalization) | (None, 13, 4) | 16 | conv_1[0][0] |
| convw_2 (Conv1D) | (None, 11, 4) | 52 | batch_1[0][0] |
| batch_2 (BatchNormalization) | (None, 11, 4) | 16 | conv_2[0][0] |
| convw_3 (Conv1D) | (None, 9, 4) | 52 | batch_2[0][0] |
| batch_3 (BatchNormalization) | (None, 9, 4) | 16 | conv_3[0][0] |
| flatten_1 (Flatten) | (None, 36) | 0 | batch_3[0][0] |
| dense_1 (Dense) | (None, 256) | 9472 | flatten_1[0][0] |
| z_mean (Dense) | (None, 20) | 5143 | dense_1[0][0] |
| z_log_var (Dense) | (None, 20) | 5143 | dense_1[0][0] |
| lambda (Lambda) | (None, 20) | 0 | z_mean[0][0] z_log_var[0][0] |
| batch_4 (BatchNormalization) | (None, 20) | 88 | lambda[0][0] |
| latent_input (Dense) | (None, 256) | 428 | batch_4[0][0] |
| repeat_vector (RepeatVector) | (None, 15, 20) | 0 | latent_input[0][0] |
| gru_1 (GRU) | (None, 15, 256) | 212736 | repeat_vectort[0][0] |
| gru_2 (GRU) | (None, 15, 256) | 393984 | gru_1[0][0] |
| gru_3 (GRU) | (None, 15, 256) | 393984 | gru_2[0][0] |
| decoded_mean (TimeDistributed) | (None, 15, 41) | 10537 | gru_3[0][0] |

Total params: 1,032,141
Trainable params: 1,032,833
Non-trainable params: 64

FIG. 3

&& # SYSTEMS AND METHODS FOR SUMMARIZING AND STEERING MULTI-USER COLLABORATIVE DATA ANALYSES

BACKGROUND

Field

The present disclosure is directed to machine learning, and more specifically, to systems and methods that utilize machine learning through a graphical user interface (GUI) to generate appropriate data charts and direct interactive data exploration.

Related Art

Exploratory visual analysis (EVA) is an iterative process in which an analyst uses visual methods, such as plotting charts with different parts of data, to identify interesting findings and make data-driven decisions. EVA can be useful when an analyst is unfamiliar with the data or has vague hypotheses and ill-defined tasks, where fully-automatic methods are difficult to develop and domain knowledge is strongly required in data exploration. This EVA approach is widely promoted and supported by many commercial tools in the related art.

Unfortunately, the EVA process becomes challenging when the dataset is larger and more complicated (e.g., involving many records and attributes). The exploration space becomes overly large as numerous choices exist for encoding attributes, parts of data, and the charts to utilize for visual analysis. One related art solution involves having multiple analysts perform EVA in a collaborative setting. For example, each of the analysts may inspect different perspectives of the data independently, then combine or hand-off their results (e.g., data charts) at some point, and continue to perform such processes iteratively.

SUMMARY

Exploratory visual analysis (EVA) can be utilized by integrating domain knowledge from a user into the process of data analysis. The process can become challenging when the dataset is larger and more complicated, where multi-user collaboration is needed. However, effectively summarizing such analyses and further indicating recommendations and direction for data exploration is still a problem in related art implementations.

There are several problems that need to be considered when providing an interface for EVA implementations. For example, there is a need to provide an interface so that information can be learned from the charts created from multiple analysts, and for facilitating effective review for the underlying findings. Obtaining a good understanding of the past work can be important for knowledge based building and coordination between analysts. In another example, there is a need to facilitate an interface so that the information learned can be utilized to determine future directions of data exploration. Visual exploration involves searching the data space for unknown targets in unknown locations, with a large variety of visual encoding options for charts. Thus, providing informative guidance in this manual process can be important GUI feature for the analysts to reach their goals with minimized efforts.

To address the above problems, example implementations described herein utilize a meta-visualization approach and involve a GUI tool that provides a visual summarization of data charts generated in multi-user exploratory visual analysis, as well as interactive steering for promising future data exploration. The example implementations of the GUI tool described herein utilize deep learning techniques (e.g., grammar variational autoencoder (GVAE)), to learn compact vector representation of charts, and visualizes them on a two-dimensional canvas (e.g., a two-dimensional map) with semantics and similarity. From this summarization, an analyst can identify clusters, trends, and holes of the charts within the current space of visual exploration. Further, the example implementations of the GUI tool allow for interactive inspection of the space by offering recommendation of charts based on selected local regions and by using the trained autoencoder for chart generation. Thus, an analyst can utilize such information to steer their analysis by refining the recommended charts.

Aspects of the present disclosure can include a method for providing a graphical user interface (GUI) to generate recommended charts, the method involving providing a first view on the GUI, the first view configured to provide representations of a plurality of charts on a map, the representations of the plurality of charts distributed within the map on the first view based on similarity derived from a encoded vectorization of the plurality of charts into a plurality of vectors; upon selection of an area within the map on the first view, generating a recommended chart derived from similarity between the selected area and one or more of the plurality of charts within or in proximity to the selected area, displaying the chart recommendation on a second view of the GUI; and providing another representation of the chart recommendation within the area on the map on the first view based on similarity between the chart recommendations and the plurality of charts.

Aspects of the present disclosure can include a non-transitory computer readable medium storing instructions for providing a graphical user interface (GUI) to generate recommended charts, the instructions involving providing a first view on the GUI, the first view configured to provide representations of a plurality of charts on a map, the representations of the plurality of charts distributed within the map on the first view based on similarity derived from a encoded vectorization of the plurality of charts into a plurality of vectors; upon selection of an area within the map on the first view, generating a recommended chart derived from similarity between the selected area and one or more of the plurality of charts within or in proximity to the selected area, displaying the chart recommendation on a second view of the GUI; and providing another representation of the chart recommendation within the area on the map on the first view based on similarity between the chart recommendations and the plurality of charts.

Aspects of the present disclosure can include a system for providing a graphical user interface (GUI) to generate recommended charts, the system involving means for providing a first view on the GUI, the first view configured to provide representations of a plurality of charts on a map, the representations of the plurality of charts distributed within the map on the first view based on similarity derived from a encoded vectorization of the plurality of charts into a plurality of vectors; upon selection of an area within the map on the first view, means for generating a recommended chart derived from similarity between the selected area and one or more of the plurality of charts within or in proximity to the selected area, means for displaying the chart recommendation on a second view of the GUI; and means for providing another representation of the chart recommendation within the area on the map on the first view based on similarity between the chart recommendations and the plurality of charts.

Aspects of the present disclosure can include an apparatus configured to provide a graphical user interface (GUI) to generate recommended charts, the apparatus involving a processor, configured to provide a first view on the GUI, the first view configured to provide representations of a plurality of charts on a map, the representations of the plurality of charts distributed within the map on the first view based on similarity derived from a encoded vectorization of the plurality of charts into a plurality of vectors; upon selection of an area within the map on the first view, generate a recommended chart derived from similarity between the selected area and one or more of the plurality of charts within or in proximity to the selected area, display the chart recommendation on a second view of the GUI; and provide another representation of the chart recommendation within the area on the map on the first view based on similarity between the chart recommendations and the plurality of charts.

BRIEF DESCRIPTION OF DRAWINGS

FIG. 3 illustrates an example of a network structure, in accordance with an example implementation.

DETAILED DESCRIPTION

Figure 1:
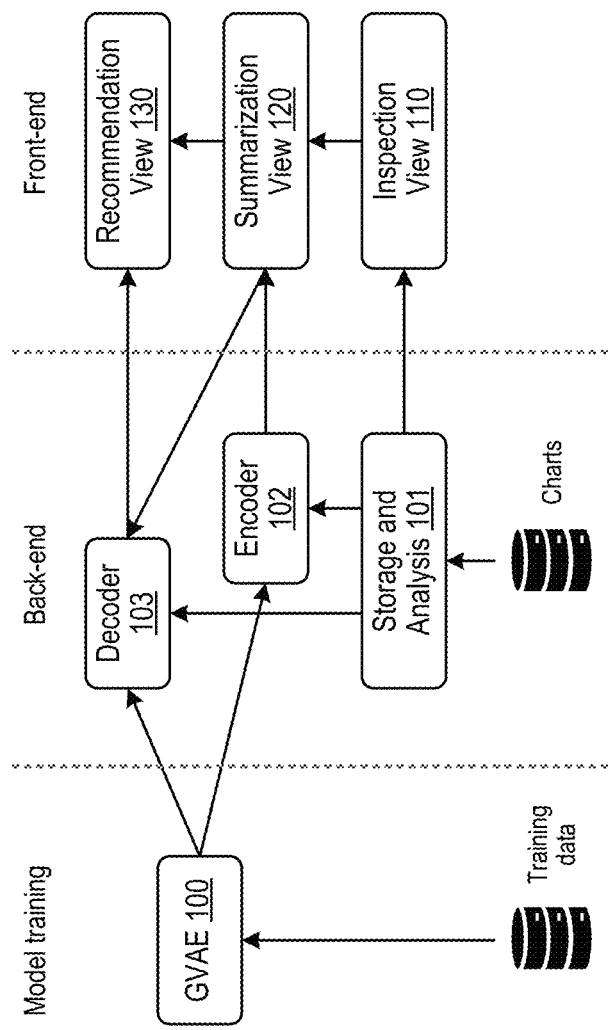
FIG. 1 illustrates an example system diagram involving the front end and the back end of the proposed GUI tool, in accordance with an example implementation.

The following detailed description provides further details of the figures and example implementations of the present application. Reference numerals and descriptions of redundant elements between figures are omitted for clarity. Terms used throughout the description are provided as examples and are not intended to be limiting. For example, the use of the term "automatic" may involve fully automatic or semi-automatic implementations involving user or administrator control over certain aspects of the implementation, depending on the desired implementation of one of ordinary skill in the art practicing implementations of the present application. Selection can be conducted by a user through a user interface or other input means, or can be implemented through a desired algorithm. Example implementations as described herein can be utilized either singularly or in combination and the functionality of the example implementations can be implemented through any means according to the desired implementations.

FIG. 1 illustrates an example system diagram involving the front end and the back end of the proposed GUI tool, in accordance with an example implementation. Example implementations involve a GUI tool that can be in the form of a web-based application having a back-end analytical engine and a frontend visual interface, the architecture of which is shown in FIG. 1.

The back-end of the GUI tool can involve a data storage and analysis module 101, a chart encoder 102, and a chart decoder 103. The data storage and analysis module 101 records the charts and their relevant information and handles basic computation tasks. The chart encoder 102 is configured to convert a data chart into a numerical vector; and the chart decoder is configured to conduct the opposite operation. The encoder and the decoder are trained through a deep learning model called Grammar Variational Autoencoder (GVAE) 100.

The front-end can involve a GUI with three interactively coordinated views: 1) an inspection view that allows for viewing, editing, and creating a selected chart 110, 2) a summarization view that presents all the charts generated during the collaborative visual exploratory analysis 120, and 3) a recommendation view that shows suggested charts 130.

The arrows in FIG. 1 denote the general data flow. More specifically, the input charts are processed in the data storage and analysis module 101, and then fed into the chart encoder 102 to generate the vector representations, which are further used for creating the visual summarization of the charts on a 2D semantic space. From the summarization view, a user can obtain a whole picture of the current analyses, identify promising directions, and leverage chart recommendations displayed in the recommendation view 130. The suggested charts are offered via interactive steering by a user, for example, via selecting an area of interest in the 2D space. Based on a user input and the existing charts, the chart decoder 103 automatically generates charts that are used for forming the recommendations. Moreover, all the charts, including the original and recommended ones, can be examined with the inspection view and further tuned for creating new charts that are recorded on the back-end.

As described herein, example implementations employ the Grammar Variational Autoencoder (GVAE) 100 to train an encoder 102 and a decoder 103 of data charts. The objective is to obtain the vector representation of charts using an unsupervised learning approach, and be able to transform any vector back to a chart. Based on the vectors provided by the chart encoder 102, example implementations can compute the semantic distances between charts and utilize the distances to perform dimension reduction, thus summarizing the charts in a lower dimensional space with semantics. Further, based on the chart decoder 103, example implementations can generate charts from vectors in the space to offer recommendations for users.

Figure 2A:
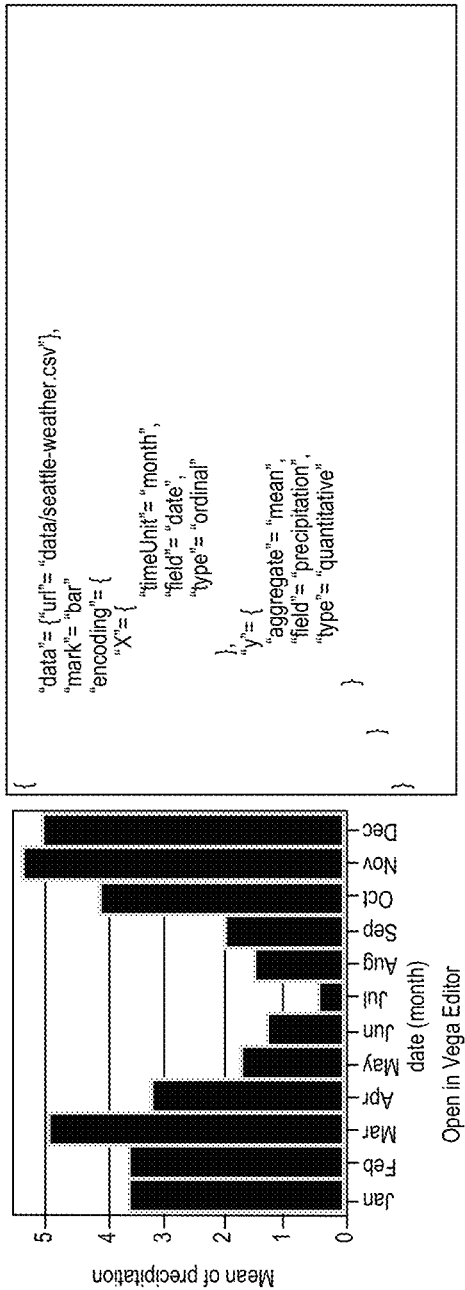
FIG. 2(a) illustrates an example specification for data visualization, in accordance with an example implementation.

Example implementations can use any declarative language for data visualization, such as VegaLite, to represent a data chart with a tree structure. FIG. 2(a) illustrates an example specification for data visualization, in accordance with an example implementation. The example shown in FIG. 2(a) involves the VegaLite specification, which is a JavaScript Object Notation (JSON) object with a nested format (e.g., a tree), however, other specifications for representing data charts can also be utilized, and the example implementations described herein are not particularly limited thereto. Following the GVAE approach, the structure is viewed as a context free grammar tree generated by a set of rules, wherein each rule is represented with a one-hot vector. These vectors are tiled together as the encoding part which is a deep convolution neural network. The decoding part is a recurrent neural network which produces a set of unnormalized log probability vectors (or "logits"). Each logit vector is then mapped back to a rule and a grammar tree can be generated. Through using the deep learning model approach such as the GVAE approach, charts can thereby be vectorized and then the vectorized charts can be compared through a similarity process such as nearest neighbor to determine how similar the charts are to each other.

Figure 2B:
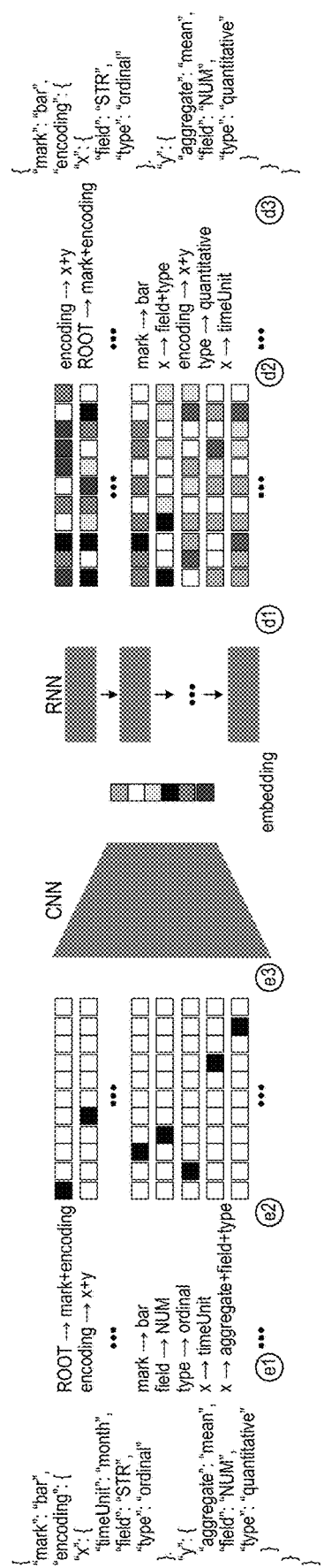
FIG. 2(b) illustrates an example of encoding and decoding through utilizing GVAE, in accordance with an example implementation.

FIG. 2(b) illustrates an example of encoding and decoding through utilizing GVAE, in accordance with an example implementation. At a high-level, GVAE is applied with the VegaLite representation of data charts from FIG. 2(a). A variational autoencoder (VAE) is configured to learn both an encoder and a decoder for mapping data points x from and to variables z in a continuous latent space. In example implementations described herein, x is a data chart and z is the compact vector representation that can be utilized to calculate chart similarity.

Based on the foundation of VAE, GVAE is configured to learn encoder and decoder mappings directly with x as parse trees that are governed by a context-free grammar (CFG). The definition of CFG contains a set of symbols (e.g., nonterminal and terminal symbols) and a set of rules (e.g., mapping from a non-terminal to a sequence of terminal and/or nonterminal symbols). Thus, the CFG determines a set of possible trees produced by recursively applying rules until all leaf nodes are terminal symbols. One benefit of GVAE leveraging CFG, compared to traditional VAE, is that it is more likely to generate valid data samples with the decoder.

As the VegaLite specification of charts is naturally a tree structure, each chart can be viewed as a parse tree that is produced by a set of rules within a CFG. For example, FIG. 2(a) illustrates a data chart, as well as its VegaLite specification and the rules that generate the JSON tree. Example implementations described herein employ GVAE to learn an encoder and a decoder of charts independent to specific datasets. Thus, the data fields in VegaLite are replaced with common tokens, particularly, quantitative fields with NUM and categorical/ordinal fields with STR. Further, example implementations exclude specifications that are not relevant to visual encodings, such as the data and schema specifications.

With the above preprocessing of data, the GVAE is trained to learn the chart encoder 102 and decoder 103 in the back-end, by employing a computation architecture as illustrated in FIG. 2(b). The encoding process used by chart encoder 102 contains: (e1) extracting rules forming the VegaLite tree; (e2) representing the rules with a collection of one-hot vectors; and (e3) feeding these vectors to a multi-layer convolutional neural network (CNN) followed by a dense layer, mapping them to a latent variable (i.e., the vector representation of the chart). The decoding process used by decoder 103 contains: (d1) converting a latent variable back to a collection of vectors (logits) with a multi-layer recurrent neural network (RNN); (d2) deriving the rules represented by these vectors; and (d3) reconstructing a VegaLite tree based on the set of rules.

FIG. 3 illustrates an example of a network structure, in accordance with an example implementation. In an example implementation, the encoder 102 involves three convolution layers, all with filter size 4 and kernel size 3, followed by a dense layer with 256 neurons; and the decoder 103 contains three Gated Recurrent Unit (GRU) layers, all with a hidden dimension of 256 neurons. The target latent dimension of the autoencoder is 20 in experiments. From applying a test dataset for training involving 4300 VegaLite specifications (upsampled to 21500 examples), experimental results have shown that it is possible to achieve higher reconstruction accuracy (e.g., over 90%) after tuning the model. In order to be dataset independent, the data attribute names are replaced with standard tokens. For example, the numerical attribute is replaced with "NUM" and categorical attribute with "STR". Thus through such example implementations, it has been shown that vectorizing charts through using the deep model techniques such as GVAE still allow for high reconstruction accuracy, thereby allowing the charts to be stored in a database in a more compressed form while storing them in a format (data vectors) that allow machine learning techniques such as nearest neighbor to be applied to determine similarity.

Figure 4:
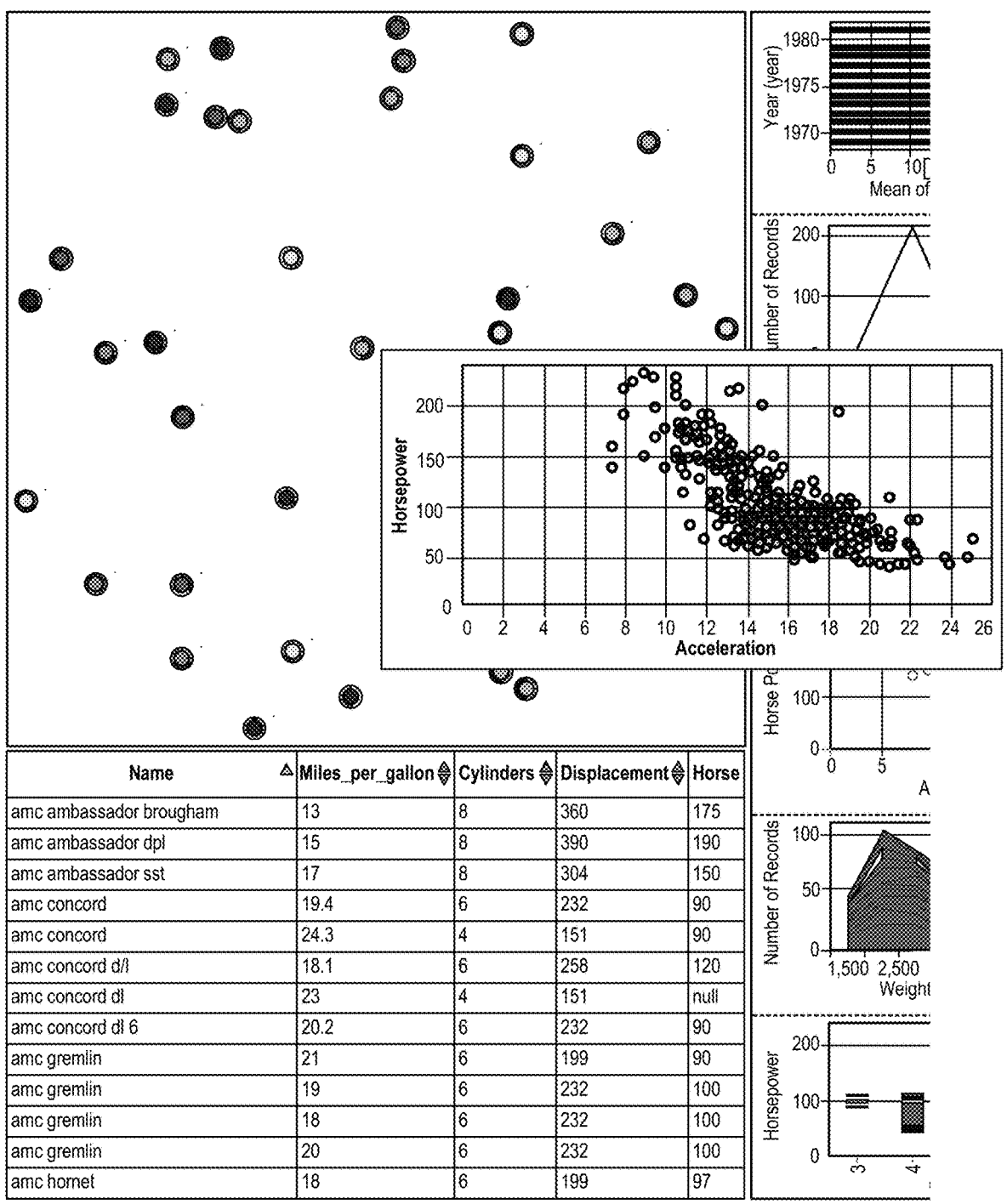
FIG. 4 illustrates an example portion of a screenshot of the GUI tool, in accordance with an example implementation.

FIG. 4 illustrates an example portion of a screenshot of the GUI tool, in accordance with an example implementation. As described earlier, the interface of the GUI tool contains three interactively coordinated panes: an Inspection View, a Summarization View, and a Recommendation View which are all integrated in FIG. 4. Each of the views are provided in more detail with respect to FIGS. 5(a) to 5(c). In this example implementation of FIG. 4, a chart is displayed on the foreground based on a selection of a chart representation in the summarization view. The chart is generated from decoding the vector associated with the selected chart representation as described with respect to decoder 103 of FIG. 1.

Figure 5A:
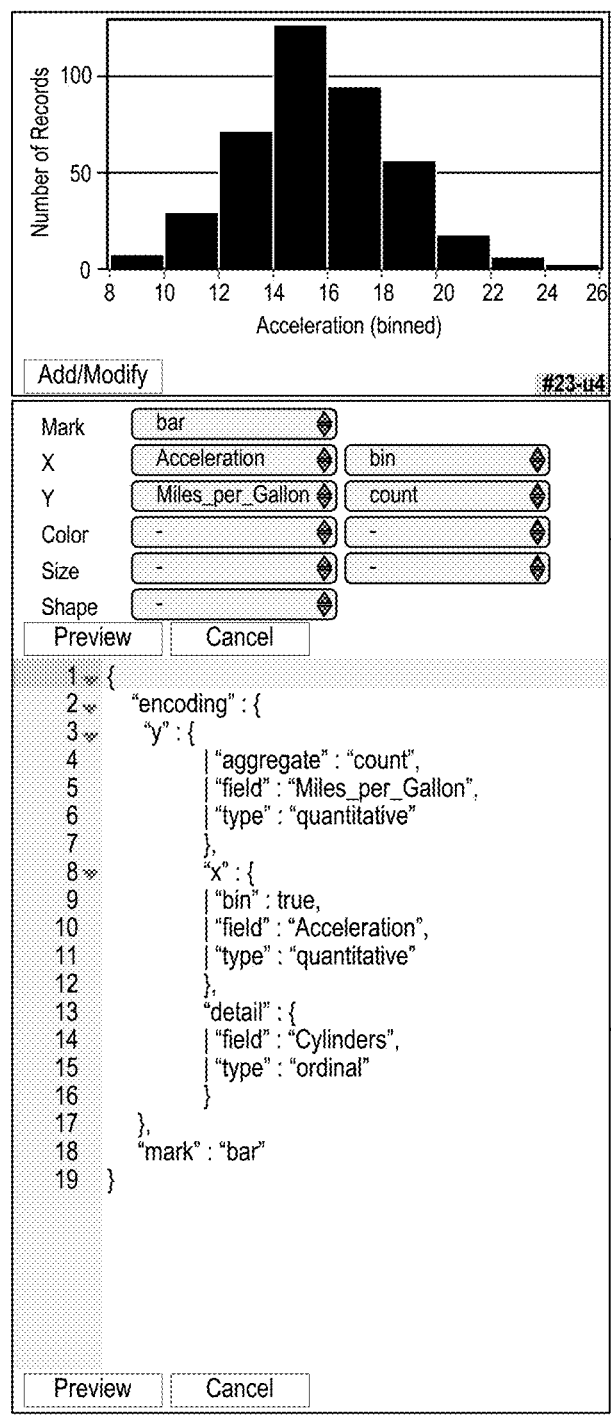
FIGS. 5(a) to 5(c) illustrate example views of the GUI tool, in accordance with an example implementation.
Figure 5B:
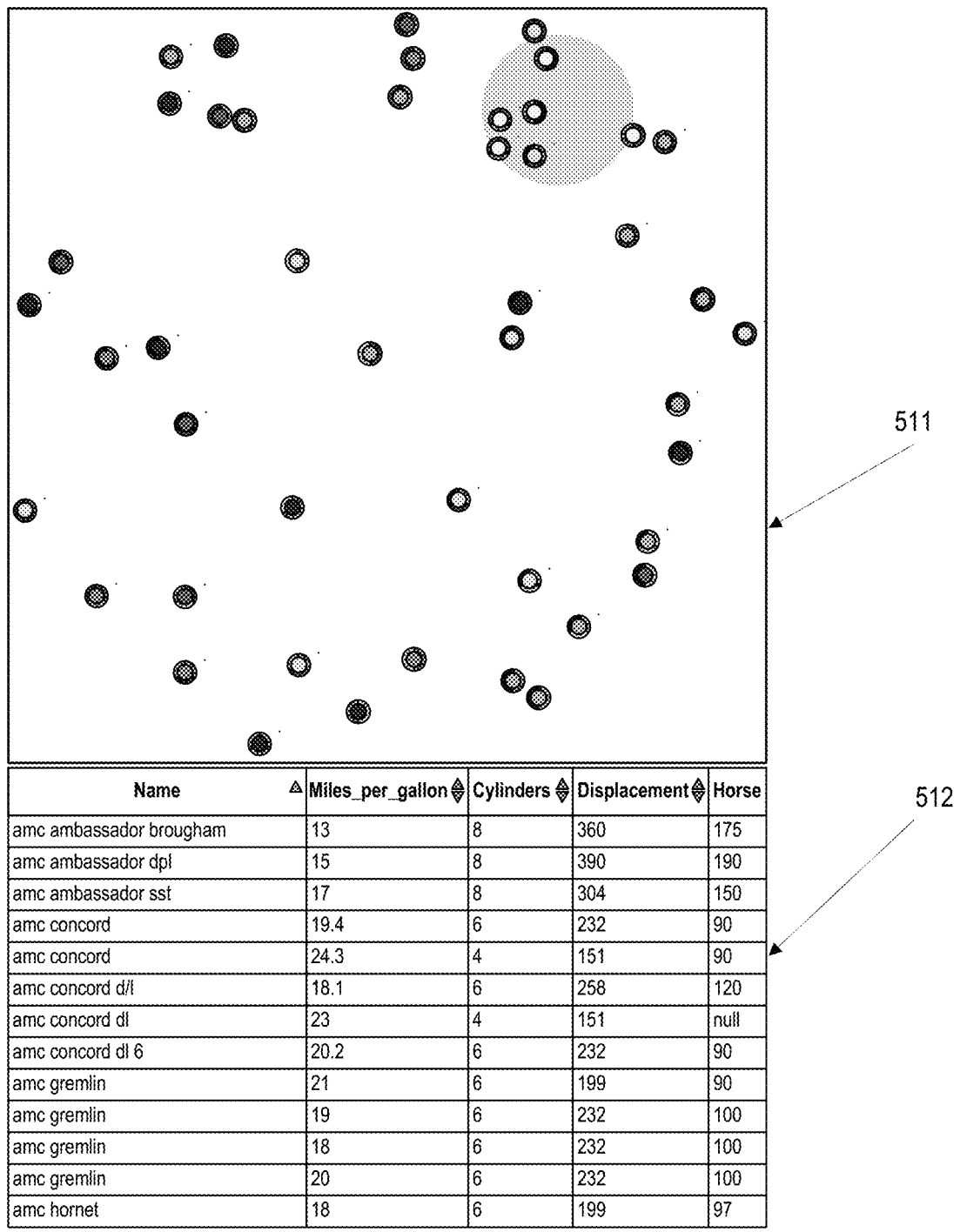
Figure 5C:
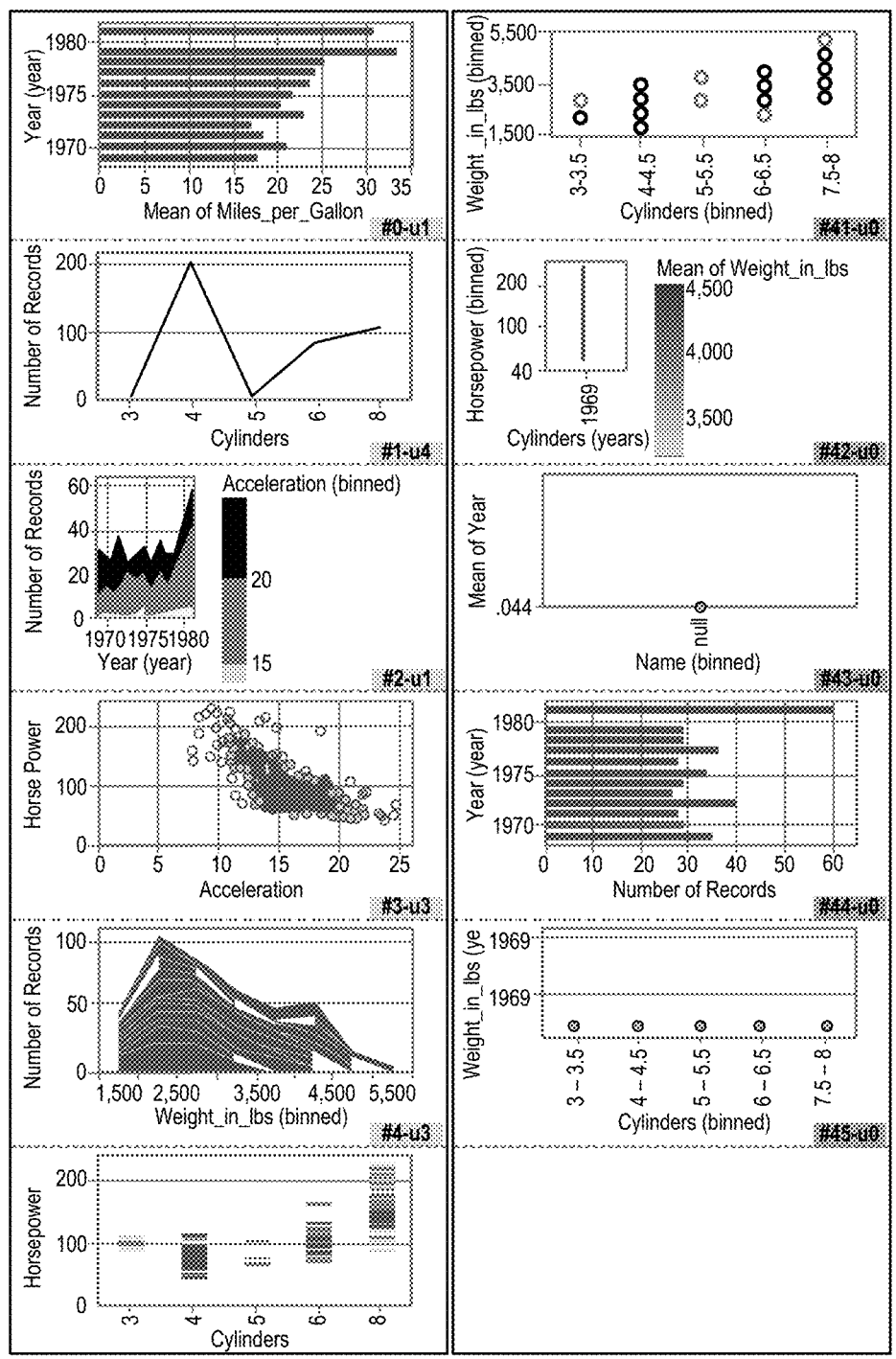

FIGS. 5(a) to 5(c) illustrate example views of the GUI tool, in accordance with an example implementation. Specifically, FIG. 5(a) illustrates an example of the inspection view. The Inspection View involves a set of standard controls 501 and a text editor 502, which allows a user to interactively view and modify a selected chart based on the VegaLite language. The user can either select the attributes from the dropdown controls or directly edit the chart specification in the editor, depending on the desired implementation.

FIGS. 5(b) and 5(c) illustrate aspects of the summarization view, in accordance with an example implementation. The Summarization View involves a chart embedding panel 511, a data table 512, and a chart list panel (FIG. 5(c)). The chart embedding panel 501 presents representations all the charts created by the user in a 2D space with dimension reduction techniques. In the example implementations described herein, dimensionality reduction processes such as multidimensional scaling (MDS) can be employed based on the vector representation of the charts generated by the back-end. The MDS process executed on the vectors thereby allows example implementations described herein to project the vectorized chart within a 2D space (e.g., a map) that is distributed based on similarity measurements. Each chart listed is associated with a representation that is distributed within the 2D space as illustrated in the chart embedding panel 511. In this example implementation, each of the representations is in the form of a circle glyph, wherein the inner circle color indicates the identity of the user who created the chart and the outer part shows the data attributes used in the chart (different color or shade of color shows different data attributes). A user can hover over each glyph to see the actual data chart in a tooltip. Further, the data table 512 shows the original dataset wherein each row indicates a record for a chart and each column indicates an attribute. Depending on the desired implementation, the data attributes are color-coded corresponding to those in the chart embedding panel. Finally, the chart list panel of FIG. 5(c)

displays all the charts to allow for navigation in accordance with the desired implementation.

By leveraging the embedding features generated by the chart encoder, example implementations can utilize ordination techniques based on dimensionality reduction to project charts onto a 2D semantic space. In example implementations, MDS is utilized, however other dimensionality reduction processes can be utilized in accordance with the desired implementation, such as t-SNE or directly training an encoder with a latent dimension of 2. In an example implementation of determining the weighted distance through using MDS in accordance with a weighted distance metric, any function involving weights applied to one or more of the Euclidean distance of the embedding vectors or the Jaccard distance between two sets of data fields of each chart can be utilized for the weighted distance metric in accordance with the desired implementation.

As illustrated in FIG. 5(b), the chart representations can be distributed in the chart embedding panel 511 and spaced out by distances based on their similarity. In such an example implementation, the similarity is derived based on a machine learning process (e.g., nearest neighbor), and a dimensionality reduction method such as MDS is configured to determine distance between vectors based on the similarity. The distances can then be visualized as illustrated in the chart embedding panel 511 to represent the distances like a map wherein the spaces between the representations indicate the vectorized similarity.

Figure 5D:
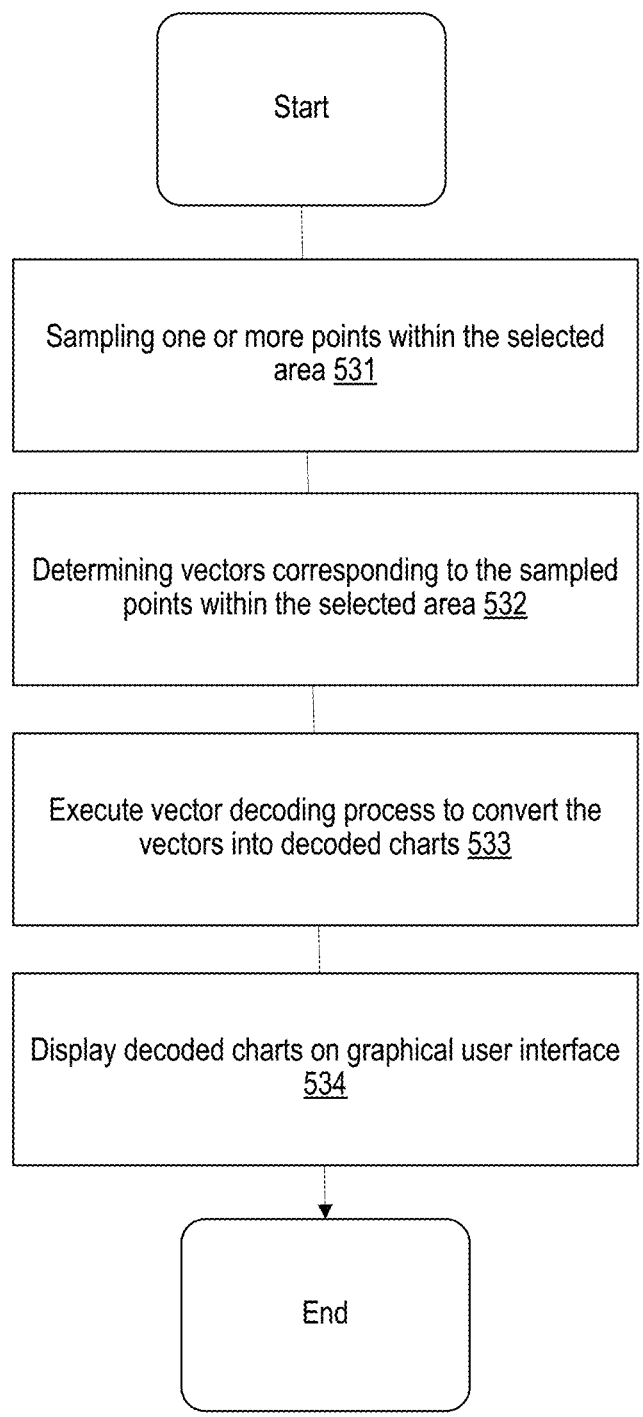
FIG. 5(d) illustrates an example flow diagram for generating chart recommendations through the GUI tool, in accordance with an example implementation.

From the chart embedding panel 511 in the Summarization View, a user can seek recommendations of charts by clicking any empty space on the panel. As shown in FIG. 5(b), a larger shaded circle indicates the local range of the current analysis space formed by the charts, and chart recommendations are constructed within the circled area. A user can iteratively explore the space and obtain recommendations in different local regions based on their desired implementation. Further, a user can refine a recommended chart in the Inspection View and add it to the current analysis. Although a shaded circle is used to determine the selected area, other implementations (e.g., a freeform defined enclosed area with a mouse cursor or gesture, a rectangle, etc.) can be utilized in accordance with the desired implementation. FIG. 5(d) illustrates an example flow diagram for generating chart recommendations through the GUI tool, in accordance with an example implementation.

At 531, the process samples one or more points within the selected area (e.g., the shaded circle area illustrated in FIG. 5(b)). The sampling to determine points and the number of points chosen within the selected area can be conducted in accordance with any desired implementation. At 532, the process determines vectors corresponding to the one or more sampled points within the selected area. As the chart embedding panel 511 example of FIG. 5(b) is in the form of a map wherein distance represents the similarity between the vectors associated with the chart representations, the vectors can be generated according to the similarity metrics utilized. For example the charts within or in proximity of the selected area can be determined from the data table 512 for data corresponding to charts within or in proximity to the selected area. Based on the corresponding data, vectors can be generated for the corresponding sampled points in accordance with a machine learning process (e.g., nearest neighbor) that determines similarity between vectors and a dimensionality reduction process such as MDS can determine the distance between the sampled point and the data corresponding to charts within or in proximity to the selected area based on the similarity, because the distance represents the similarity between the vector of the sampled point and the vector of the known chart. At 533, the process conducts a vector decoding process configured to convert the vector into a decoded chart as described with respect to decoder 103 of FIG. 1. At 534, the process provides (e.g., displays) the decoded chart as the recommended chart. In an example implementation and as illustrated in FIG. 5(c), one column can be dedicated to the chart recommendations as illustrated on the generated charts on the right column of FIG. 5(c) to facilitate the recommendation view.

Figure 6:
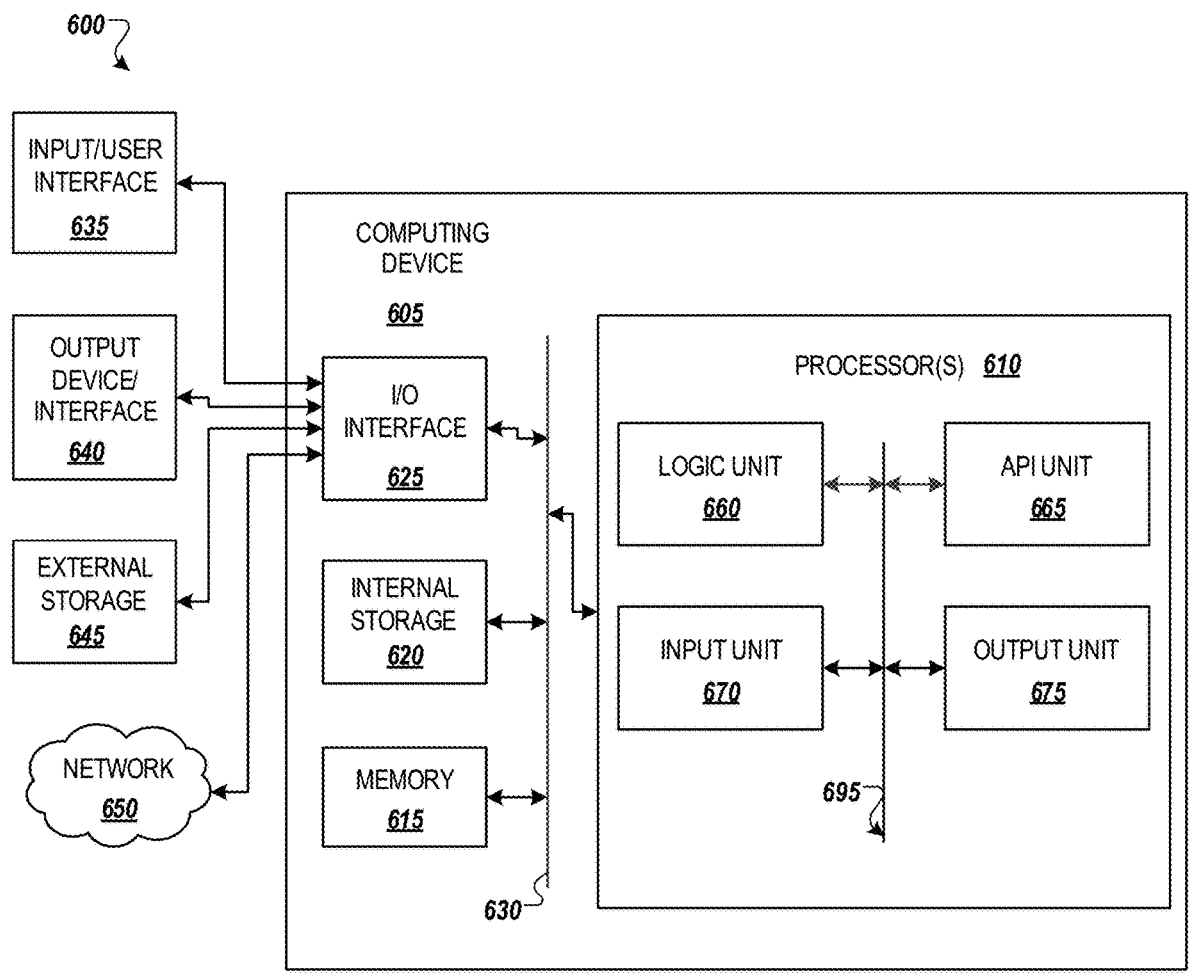
FIG. 6 illustrates an example computing environment with an example computer device suitable for use in some example implementations.

FIG. 6 illustrates an example computing environment with an example computer device suitable for use in some example implementations. Computer device 605 in computing environment 600 can include one or more processing units, cores, or processors 610, memory 615 (e.g., RAM, ROM, and/or the like), internal storage 620 (e.g., magnetic, optical, solid state storage, and/or organic), and/or I/O interface 625, any of which can be coupled on a communication mechanism or bus 630 for communicating information or embedded in the computer device 605. I/O interface 625 is also configured to receive images from cameras or provide images to projectors or displays, depending on the desired implementation.

Computer device 605 can be communicatively coupled to input/user interface 635 and output device/interface 640. Either one or both of input/user interface 635 and output device/interface 640 can be a wired or wireless interface and can be detachable. Input/user interface 635 may include any device, component, sensor, or interface, physical or virtual, that can be used to provide input (e.g., buttons, touch-screen interface, keyboard, a pointing/cursor control, microphone, camera, braille, motion sensor, optical reader, and/or the like). Output device/interface 640 may include a display, television, monitor, printer, speaker, braille, or the like. In some example implementations, input/user interface 635 and output device/interface 640 can be embedded with or physically coupled to the computer device 605. In other example implementations, other computer devices may function as or provide the functions of input/user interface 635 and output device/interface 640 for a computer device 605.

Examples of computer device 605 may include, but are not limited to, highly mobile devices (e.g., smartphones, devices in vehicles and other machines, devices carried by humans and animals, and the like), mobile devices (e.g., tablets, notebooks, laptops, personal computers, portable televisions, radios, and the like), and devices not designed for mobility (e.g., desktop computers, other computers, information kiosks, televisions with one or more processors embedded therein and/or coupled thereto, radios, and the like).

Computer device 605 can be communicatively coupled (e.g., via I/O interface 625) to external storage 645 and network 650 for communicating with any number of networked components, devices, and systems, including one or more computer devices of the same or different configuration. Computer device 605 or any connected computer device can be functioning as, providing services of, or referred to as a server, client, thin server, general machine, special-purpose machine, or another label.

I/O interface 625 can include, but is not limited to, wired and/or wireless interfaces using any communication or I/O protocols or standards (e.g., Ethernet, 802.11x, Universal System Bus, WiMax, modem, a cellular network protocol, and the like) for communicating information to and/or from at least all the connected components, devices, and network in computing environment 600. Network 650 can be any network or combination of networks (e.g., the Internet, local area network, wide area network, a telephonic network, a cellular network, satellite network, and the like).

Computer device 605 can use and/or communicate using computer-usable or computer-readable media, including transitory media and non-transitory media. Transitory media include transmission media (e.g., metal cables, fiber optics), signals, carrier waves, and the like. Non-transitory media include magnetic media (e.g., disks and tapes), optical media (e.g., CD ROM, digital video disks, Blu-ray disks), solid state media (e.g., RAM, ROM, flash memory, solid-state storage), and other non-volatile storage or memory.

Computer device 605 can be used to implement techniques, methods, applications, processes, or computer-executable instructions in some example computing environments. Computer-executable instructions can be retrieved from transitory media, and stored on and retrieved from non-transitory media. The executable instructions can originate from one or more of any programming, scripting, and machine languages (e.g., C, C++, C#, Java, Visual Basic, Python, Perl, JavaScript, and others).

Processor(s) 610 can execute under any operating system (OS) (not shown), in a native or virtual environment. One or more applications can be deployed that include logic unit 660, application programming interface (API) unit 665, input unit 670, output unit 675, and inter-unit communication mechanism 695 for the different units to communicate with each other, with the OS, and with other applications (not shown). The described units and elements can be varied in design, function, configuration, or implementation and are not limited to the descriptions provided. Processor(s) 610 can be in the form of hardware processors such as central processing units (CPUs) or in a combination of hardware and software units.

In some example implementations, when information or an execution instruction is received by API unit 665, it may be communicated to one or more other units (e.g., logic unit 660, input unit 670, output unit 675). In some instances, logic unit 660 may be configured to control the information flow among the units and direct the services provided by API unit 665, input unit 670, output unit 675, in some example implementations described above. For example, the flow of one or more processes or implementations may be controlled by logic unit 660 alone or in conjunction with API unit 665. The input unit 670 may be configured to obtain input for the calculations described in the example implementations, and the output unit 675 may be configured to provide output based on the calculations described in example implementations.

Processor(s) 610 can be configured to provide a graphical user interface (GUI) to generate recommended charts as illustrated in FIG. 4 and in FIGS. 5(a) to 5(c), the method involving providing a first view on the GUI, the first view configured to provide representations of a plurality of charts on a map, the representations of the plurality of charts distributed within the map on the first view based on similarity derived from a encoded vectorization of the plurality of charts into a plurality of vectors as illustrated in FIG. 5(b); upon selection of an area within the map on the first view as illustrated in FIG. 5(b), generating a recommended chart derived from similarity between the selected area and one or more of the plurality of charts within or in proximity to the selected area, and displaying the chart recommendation on a second view of the GUI as illustrated in the right column of FIG. 5(c). In another example implementation, if the recommended chart is determined to be acceptable, a representation of the chart recommendation can be placed on the map illustrated in FIG. 5(b) (i.e. another representation is generated at the sampled point within the selected area on chart embedding panel 511) based on similarity between the chart recommendations and the plurality of charts. The added representation is spaced out from the other representations based on the vector similarity.

In example implementations the encoded vectorization of the plurality of charts into the plurality of vectors can be conducted by a vectorization process trained by Grammar Variational Autoencoder (GVAE) as described in FIG. 1.

As illustrated in FIG. 5(b), the representations of the plurality of charts can be distributed within the map on the first view as determined from a dimensionality reduction process (e.g., such as MDS) configured to determine a distance between each of the representations of the plurality of charts based on the similarity between the plurality of vectors. As described in FIG. 1, because a deep learning model such as GVAE is utilized, charts can be encoded into vectors and decoded from vectors to charts again. Because the charts are encoded into vectors through a machine learning process, machine learning processes such as nearest neighbor can be utilized to conduct similarity computations, whereupon dimensionality reduction processes such as MDS can thereby be employed to determine the distance between charts based on the determined similarity. Such distances can thereby be utilized for placing the chart representations on a map as illustrated in FIG. 5(b).

As described in FIG. 5(d), the processor(s) 610 can be configured to generate a recommended chart derived from similarity between the selected area and one or more of the plurality of charts within or in proximity to the selected area by sampling a point within the selected area; determining a vector corresponding to the point within the selected area; conducting a vector decoding process configured to convert the vector into a decoded chart; and providing the decoded chart as the recommended chart.

As illustrated in FIG. 5(a), selection of a representation of a chart in FIG. 5(b) or a chart in FIG. 5(c) can generate another view as illustrated in FIG. 5(a). Accordingly, processor(s) 610, can be configured to, for receiving a selection of a representation from the representations of the plurality of charts distributed within the map on the first view as illustrated in FIG. 5(b), generate a third view as illustrated in FIG. 5(a) involving a text editor 502 to edit source code that generates the chart, and dropdown controls 501 to modify the chart in accordance with the desired implementation.

As illustrated in FIG. 4, the chart representations are configured to be selectable according to any desired implementation (e.g., touch interface, mouse cursor selection, etc.) so that processor(s) 610 can be configured to, for receiving a selection of a representation from the representations of the plurality of charts distributed within the map on the first view, conduct a vector decoding process configured to convert a vector from the plurality of vectors corresponding to the representation from the representations of the plurality of charts into a chart as described with respect to decoder 103, and generate the chart for display as illustrated in the foreground chart of FIG. 4.

Through the example implementations described herein involving a vectorization process to encode the charts into vectors, and decode vectors back into charts, it is therefore possible to provide a GUI that relates representations of charts on a map as illustrated in FIG. 5(b) based on similarity. Such techniques are improvements over the related art because the vectorization of the charts allows machine learning techniques such as nearest neighbor to determine the similarity between charts to be applied, which saves processing time in comparison to applying machine learning techniques to determine similarity between charts without the vectorization process. Through the vectorization, MDS can also be employed to project chart representations on a 2D space such as a map based on the similarity as determined between vectorized charts from nearest neighbor processes.

Further, such implementations facilitate a GUI view in which an area between representations can be selected and sampled. As shown in FIG. 5(b), because the chart representations are separated by distance according to similarity, vectors can be determined for data points sampled within a selected area based on executing a reverse process on the similarity as the similarity from the sampled points and known charts is thereby known based on the distance, and the vector of known charts can be used as reference point to derive the vector of the sampled points. Once the vectors are obtained, the decode process 103 as illustrated in FIG. 1 can thereby be utilized to convert the vector into a chart recommendation and provided as illustrated in FIG. 5(c).

Further, because the chart representations can be placed on a map as illustrated in FIG. 5(b), a GUI can be provided to indicate space between chart representations due to the chart representations being separated by similarity. Through such example implementations, users can thereby select an area between chart representations for data exploration and for generating chart recommendations. Such example implementations are an improvement over the related art because without such a GUI function, it would otherwise be difficult for users to determine what other charts should be explored given the currently generated set of charts.

Some portions of the detailed description are presented in terms of algorithms and symbolic representations of operations within a computer. These algorithmic descriptions and symbolic representations are the means used by those skilled in the data processing arts to convey the essence of their innovations to others skilled in the art. An algorithm is a series of defined steps leading to a desired end state or result. In example implementations, the steps carried out require physical manipulations of tangible quantities for achieving a tangible result.

Unless specifically stated otherwise, as apparent from the discussion, it is appreciated that throughout the description, discussions utilizing terms such as "processing," "computing," "calculating," "determining," "displaying," or the like, can include the actions and processes of a computer system or other information processing device that manipulates and transforms data represented as physical (electronic) quantities within the computer system's registers and memories into other data similarly represented as physical quantities within the computer system's memories or registers or other information storage, transmission or display devices.

Example implementations may also relate to an apparatus for performing the operations herein. This apparatus may be specially constructed for the required purposes, or it may include one or more general-purpose computers selectively activated or reconfigured by one or more computer programs. Such computer programs may be stored in a computer readable medium, such as a computer-readable storage medium or a computer-readable signal medium. A computer-readable storage medium may involve tangible mediums such as, but not limited to optical disks, magnetic disks, read-only memories, random access memories, solid state devices and drives, or any other types of tangible or non-transitory media suitable for storing electronic information. A computer readable signal medium may include mediums such as carrier waves. The algorithms and displays presented herein are not inherently related to any particular computer or other apparatus. Computer programs can involve pure software implementations that involve instructions that perform the operations of the desired implementation.

Various general-purpose systems may be used with programs and modules in accordance with the examples herein, or it may prove convenient to construct a more specialized apparatus to perform desired method steps. In addition, the example implementations are not described with reference to any particular programming language. It will be appreciated that a variety of programming languages may be used to implement the teachings of the example implementations as described herein. The instructions of the programming language(s) may be executed by one or more processing devices, e.g., central processing units (CPUs), processors, or controllers.

As is known in the art, the operations described above can be performed by hardware, software, or some combination of software and hardware. Various aspects of the example implementations may be implemented using circuits and logic devices (hardware), while other aspects may be implemented using instructions stored on a machine-readable medium (software), which if executed by a processor, would cause the processor to perform a method to carry out implementations of the present application. Further, some example implementations of the present application may be performed solely in hardware, whereas other example implementations may be performed solely in software. Moreover, the various functions described can be performed in a single unit, or can be spread across a number of components in any number of ways. When performed by software, the methods may be executed by a processor, such as a general purpose computer, based on instructions stored on a computer-readable medium. If desired, the instructions can be stored on the medium in a compressed and/or encrypted format.

Moreover, other implementations of the present application will be apparent to those skilled in the art from consideration of the specification and practice of the teachings of the present application. Various aspects and/or components of the described example implementations may be used singly or in any combination. It is intended that the specification and example implementations be considered as examples only, with the true scope and spirit of the present application being indicated by the following claims.

What is claimed is:

1. A method for providing a graphical user interface (GUI) to generate recommended charts, the method comprising:
   providing a first visualization of the GUI, the first visualization configured to provide representations of a plurality of data charts on a map, the representations of the plurality of data charts distributed within the map of the first visualization based on similarities derived from a encoded vectorization of the plurality of charts into a plurality of vectors;
   upon selection of an area within the map on the first visualization, generating a recommended data chart derived from similarity between the selected area and one or more of the plurality of data charts within or in proximity to the selected area;
   displaying the generated data chart recommendation on a second visualization of the GUI; and
   providing another representation of the generated data chart recommendation on the first visualization and within the selected area on the map based on similarity between the generated data chart recommendation and the plurality of data charts.

2. The method of claim 1, wherein the encoded vectorization of the plurality of data charts into the plurality of vectors is conducted by a vectorization process trained by Grammar Variational Autoencoder (GVAE).

3. The method of claim 1, wherein the representations of the plurality of data charts are distributed within the map on the first visualization as determined from a dimensionality reduction process configured to determine a distance between each of the representations of the plurality of data charts based on the similarity between the plurality of vectors.

4. The method of claim 1, wherein the generating a recommended data chart derived from similarity between the selected area and one or more of the plurality of data charts within or in proximity to the selected area comprises:
sampling a point within the selected area;
determining a vector corresponding to the point within the selected area;
conducting a vector decoding process configured to convert the vector into a decoded data chart; and
providing the decoded chart as the recommended data chart.

5. The method of claim 1, further comprising:
for receiving a selection of a representation from the representations of the plurality of data charts distributed within the map on the first visualization, generating a third visualization comprising a text editor to edit source code that generates the data chart, and drop-down controls to modify the data chart.

6. The method of claim 1, further comprising:
for receiving a selection of a representation from the representations of the plurality of data charts distributed within the map on the first visualization, conducting a vector decoding process configured to convert a vector from the plurality of vectors corresponding to the representation from the representations of the plurality of data charts into a chart and;
generating the data chart for display.

7. The method of claim 1, wherein each data chart of the plurality of data charts comprising a graphical representation of data.

8. The method of claim 1, wherein each of the representations is a circle glyph, wherein an inner circle color indicates an identity of a user who created the data chart and an outer part is indicative of data attributes used in the respective data chart.

9. A non-transitory computer readable medium storing instructions for providing a graphical user interface (GUI) to generate recommended charts, the instructions comprising:
providing a first visualization of the GUI, the first visualization configured to provide representations of a plurality of data charts on a map, the representations of the plurality of data charts distributed within the map of the first visualization based on similarities derived from a encoded vectorization of the plurality of charts into a plurality of vectors;
upon selection of an area within the map on the first visualization, generating a recommended data chart derived from similarity between the selected area and one or more of the plurality of data charts within or in proximity to the selected area;
displaying the generated data chart recommendation on a second visualization of the GUI; and
providing another representation of the generated data chart recommendation on the first visualization and within the selected area on the map based on similarity between the generated data chart recommendation and the plurality of data charts.

10. The non-transitory computer readable medium of claim 9, wherein the encoded vectorization of the plurality of data charts into the plurality of vectors is conducted by a vectorization process trained by Grammar Variational Autoencoder (GVAE).

11. The non-transitory computer readable medium of claim 9, wherein the representations of the plurality of data charts are distributed within the map on the first visualization as determined from a dimensionality reduction process configured to determine a distance between each of the representations of the plurality of data charts based on the similarity between the plurality of vectors.

12. The non-transitory computer readable medium of claim 9, wherein the generating a recommended data chart derived from similarity between the selected area and one or more of the plurality of data charts within or in proximity to the selected area comprises:
sampling a point within the selected area;
determining a vector corresponding to the point within the selected area;
conducting a vector decoding process configured to convert the vector into a decoded data chart; and
providing the decoded chart as the recommended data chart.

13. The non-transitory computer readable medium of claim 9, the instructions further comprising:
for receiving a selection of a representation from the representations of the plurality of data charts distributed within the map on the first visualization, generating a third visualization comprising a text editor to edit source code that generates the data chart, and drop-down controls to modify the data chart.

14. The non-transitory computer readable medium of claim 9, the instructions further comprising:
for receiving a selection of a representation from the representations of the plurality of data charts distributed within the map on the first visualization, conducting a vector decoding process configured to convert a vector from the plurality of vectors corresponding to the representation from the representations of the plurality of data charts into a chart and;
generating the data chart for display.

15. An apparatus configured to provide a graphical user interface (GUI) to generate recommended charts, the apparatus comprising:
a processor, configured to:
provide a first visualization of the GUI, the first visualization configured to provide representations of a plurality of data charts on a map, the representations of the plurality of data charts distributed within the map of the first visualization based on similarities derived from a encoded vectorization of the plurality of charts into a plurality of vectors;
upon selection of an area within the map on the first visualization, generate a recommended data chart derived from similarity between the selected area and one or more of the plurality of data charts within or in proximity to the selected area;
display the generated data chart recommendation on a second visualization of the GUI; and
provide another representation of the generated data chart recommendation on the first visualization and within the selected area on the map based on similarity between the generated data chart recommendation and the plurality of data charts.

16. The apparatus of claim 15, wherein the encoded vectorization of the plurality of data charts into the plurality of vectors is conducted by a vectorization process trained by Grammar Variational Autoencoder (GVAE).

17. The apparatus of claim 15, wherein the representations of the plurality of data charts are distributed within the map on the first visualization as determined from a dimensionality reduction process configured to determine a distance between each of the representations of the plurality of data charts based on the similarity between the plurality of vectors.

18. The apparatus of claim 15, wherein the processor is configured to generate a recommended data chart derived from similarity between the selected area and one or more of the plurality of data charts within or in proximity to the selected area by:
  sampling a point within the selected area;
  determining a vector corresponding to the point within the selected area;
  conducting a vector decoding process configured to convert the vector into a decoded data chart; and
  providing the decoded chart as the recommended data chart.

19. The apparatus of claim 15, the processor further configured to:
  for receiving a selection of a representation from the representations of the plurality of data charts distributed within the map on the first visualization, generate a third visualization comprising a text editor to edit source code that generates the data chart, and drop-down controls to modify the data chart.

20. The apparatus of claim 15, the processor further configured to:
  for receiving a selection of a representation from the representations of the plurality of data charts distributed within the map on the first visualization, conduct a vector decoding process configured to convert a vector from the plurality of vectors corresponding to the representation from the representations of the plurality of data charts into a chart and;
  generate the data chart for display.

* * * * *